United States Patent [19]

Labana et al.

[11] 3,873,493

[45] Mar. 25, 1975

[54] PROCESS FOR MAKING REINFORCED THERMOSETS FROM EPOXY-FUNCTIONAL COPOLYMERS AND CROSSLINKING AGENTS

[75] Inventors: Santokh S. Labana, Dearborn Heights; Ares N. Theodore, Farmington, both of Mich.

[73] Assignee: Ford Motor Company, Dearborn, Mich.

[22] Filed: Feb. 15, 1974

[21] Appl. No.: 443,041

Related U.S. Application Data

[63] Continuation of Ser. No. 209,348, Dec. 17, 1971, abandoned.

[52] U.S. Cl. ............ 260/42.28, 260/34.2, 260/42.29
[51] Int. Cl. ............................................. C08f 45/04
[58] Field of Search ..... 260/41 A, 42, 42.28, 42.29, 260/80.72, 86.1 E, 34.2

[56] References Cited
UNITED STATES PATENTS

| | | | |
|---|---|---|---|
| 2,580,901 | 1/1952 | Erickson et al. | 260/80.72 |
| 3,518,220 | 6/1970 | Landua et al. | 260/37 EP |
| 3,576,782 | 4/1971 | Molbert et al. | 260/41 AG |
| 3,586,654 | 6/1971 | Lerman et al. | 260/34.2 X |

OTHER PUBLICATIONS

Lee et al., HANDBOOK OF EPOXY RESINS, McGraw-Hill Book Co., 1967, pp. 15–19, 20.

*Primary Examiner*—Lewis T. Jacobs
*Attorney, Agent, or Firm*—Roger L. May; Keith L. Zerschling; Olin B. Johnson

[57] ABSTRACT

An improved method for preparing reinforced thermosets employing epoxy-functional acrylic copolymers and crosslinking agents therefor which comprises forming a dry intimate, homogeneous, mixture of particulate solids which on a catalyst-free basis comprises an epoxy-functional copolymer of acrylic monomers of which glycidyl methacrylate is a constituent monomer, an organic crosslinking agent for said copolymer, and inorganic reinforcing material and which have average maximum particle diameter between about 5 and about 10 microns with less than 10 percent of said particles having maximum diameter above 25 microns and molding said mixture at a temperature in the range of about 300°–400° F. at a pressure in the range of about 500 to about 2,000 psi.

11 Claims, No Drawings

PROCESS FOR MAKING REINFORCED THERMOSETS FROM EPOXY-FUNCTIONAL COPOLYMERS AND CROSSLINKING AGENTS

This is a continuation of application Ser. No. 209,348, filed Dec. 17, 1971, and now abandoned.

THE INVENTION

Thermoset molding powders comprising epoxy-functional copolymers of acrylic monomers ordinarily will contain in addition to the epoxy-functional prepolymer, an organic crosslinking agent for such prepolymer, a catalyst, and inorganic particulate reinforcing material. A high degree of dispersion of these components is essential to obtain reinforced moldings which have good mechanical properties. This can be accomplished by solution blending extrusion or roll milling of the ingredients. Although these methods provide homogeneous powders, they are expensive, tedious and provide molding powders characterized by limited shelf-lives.

It now has been found that homogeneous, conveniently processable molding powders with extended shelf-lives can be made and molded to form reinforced thermosets by a process of dry, solid state blending and strict particle size limitation.

In this method, dry, solid state materials, excluding glass or other fibrous reinforcing materials but including all other components, i.e., the epoxy-functional prepolymer, the organic crosslinking agent, catalyst, particulate inorganic reinforcing materials, and other organic additives, if any, are reduced to particulate form by grinding or other suitable means and further reduced in size by ball-milling or equivalent means to average maximum diameter in the range of about 5 to about 10 microns. No more than about 10 percent, preferably not more than 5 percent, of such particles should have maximum diameter above 25 microns. The particulate inorganic reinforcing material may be reduced in particle size either with the organic components or separately and subsequently mixed with the organic components. Chopped glass fibers or other fibrous material is advantageously added after particle reduction and homogeneously distributed with the molding powder and particulate, inorganic reinforcing material by tumbling or other suitable means.

I. Composition of the Prepolymer

The prepolymer preferably has at least three constituent monomers and, except for limited substitution as herein after noted, has the following basic composition:

| | |
|---|---|
| glycidyl methacrylate | 15 – 40, preferably 20 – 35 wt. % |
| methacrylonitrile | 0 – 30, preferably 10 – 25 wt. % |
| methyl methacrylate | balance |

Acrylonitrile may be substituted in whole or in part for the methacrylonitrile but the latter is the preferred reactant in that products produced from prepolymers containing this constituent and the crosslinking agents used herein have a higher heat distortion (glass transition) temperature than do the corresponding products using acrylonitrile, all other factors being equal.

A minor portion of the methyl methacrylate, preferably not more than one-third thereof, may be replaced with styrene, alpha methyl styrene, vinyl acetate or a different ester of acrylic or methacrylic acid and a monohydric alcohol, preferably a $C_2$–$C_4$ alcohol, e.g., ethyl acrylate, butyl acrylate, butyl methacrylate, etc. This substitute should not exceed about 15 percent of the total monomers used to form the prepolymer and preferably does not exceed 10% of the same. In the case of the $C_4$ substitutes, this component preferably does not exceed one-fifth of the methyl methacrylate. The substitutes mentioned in this paragraph, with the exception of styrene, increase the flexibility of the polymer, i.e., the elongation-to-break factor, and decrease the softening point (glass transition temperature).

II. Properties of the Prepolymer

The prepolymer has an average molecular weight in the range of about 1,500 to about 16,000, preferably about 2,000 to about 10,000, and more preferably about 3,500 to about 8,000, as determined by vapor phase osmometry using methyl ethyl ketone as solvent. Less than about 5% of the molecules thereof should have a molecular weight below about 1,000.

The prepolymer has a softening point above 25°C., preferably in the range of about 50° to about 110° C.

III. Preparation of the Prepolymer

The prepolymer is advantageously formed by solution polymerization using heat, a free radical initiator and an inert solvent. The prepolymer is preferably recovered by coagulation. Hexane, a mixture of hexane and toluene, etc., are suitable for this purpose. It may be recovered by evaporation but if this embodiment is used the product should be washed with a suitable solvent to remove low molecular weight components.

A free radical initiator is dissolved in the combined monomeric reactants and is advantageously employed in an amount equal to about 1–4 wt. % of the combined monomer weight. Conventional free radical initiators are suitable for this purpose, e.g., acylperoxides, peresters, and azo compounds. Specific materials which have been used successfully include 2,2'-azobis (2-methyl propionitrile) hereinafter termed AIBN, benzoyl peroxide, 5-butyl perbenzoate, and t-butyl peroxypivalate.

As aforementioned, the reaction is carried out in an inert solvent, e.g., toluene or a mixture of toluene and dioxane, etc. Advantageously, the weight of the solvent is equal to or in excess of the combined weight of the reactant and the initiator.

In a preferred method of preparation, the monomeric reactants and the free radical initiator are added in small increments, e.g., dropwise, to the solvent heated to reflux under nitrogen. When addition is complete, initiator in the amount of about 0.1% monomer weight is dissolved in a small amount of solvent and added over a period of 20–60 minutes. The reflux is then continued for about 2 hours. The prepolymer is then recovered by coagulation. This is preferably effected in the following manner. The reaction solution is further diluted with additional solvent until the prepolymer comprises about 20 to about 30 weight percent of the resultant solution. This solution is then added slowly to a liquid that will effect precipitation of the prepolymer. In this instance, hexane is quite suitable. A fine powder precipitates. This is recovered by filtration, dried, and, if necessary, broken up by rolling or grinding.

In addition to the aforedescribed method of prepolymer preparation, the prepolymer can be formed by the well-known techniques of emulsion polymerization, bulk polymerization and suspension polymerization. Suspension polymerization is preferably carried out using water as the suspending medium. Since ionic stabilizers react with glycidyl methacrylate, only nonionic materials may be used for stabilizing the suspension. Polyvinyl alcohol and an alkyl aryl polyether alcohol (Triton X 100 — Rohm & Hass Co.) have been found quite satisfactory. To carry out suspension polymerization, the monomer mixture is added to cooled (about 0° C.) have been found quite satisfactory. To carry out suspension polymerization, the monomer mixture is added to cooled (about 0° C.) 0.16% solution of polyvinyl alcohol in water. The mixture is stirred rapidly and the initiator added over a period of about 30 minutes. The temperature of the reaction mixture is then controlled to remain between 55° and 60° C. for 6 or 8 hours. After cooling to room temperature, the polymer is collected by filtration. Because the polymerization must be carried out below 65° C., only the initiators which are an efficient source of free radicals below this temperature may be used. Suitable initiators for suspension polymerization include t-butyl peroxypivalate and diisopropyl peroxycarbonate. The molecular weight of the prepolymer can be controlled, among other ways, by using 0.1 to about 5 weight percent (based on monomer weight) of a chain transfer agent such as lauryl mercaptan.

IV. Crosslinking Agent

Suitable crosslinking agents include monomeric anhydrides, polymeric polyanhydrides, dibasic acids, diphenols, diphenol-diepoxide adducts, aromatic amines, blocked di- or tri-isocyanates.

These monomeric anhydrides include, but not by way of limitation, 1. monomeric anhydrides of acyclic dicarboxylic acids wherein each carbon atom in an anhydride group is directly attached to one of a pair of carbon atoms which are directly attached to and adjacent to each other, e.g., succinic anhydride, citraconic anhydride, 1,2-dimethyl succinic anhydride, and dodecyl succinic anhydride, 2. monomeric anhydrides of acyclic dicarboxylic acids wherein each carbon atom in an anhydride group is directly attached to one of a pair of carbon atoms which are not directly attached to and adjacent to each other (i.e., separated by at least one carbon atom), e.g., glutaric anhydride, 1,2-dimethyl glutaric anhydride, and 1,3-dimethyl glutaric anhydride, and 3. monomeric anhydrides of cyclic di-, tri-, or tetracarboxylic acids wherein each carbon atom of an anhydride group is directly attached to one of a pair of directly attached and adjacent carbon atoms of a $C_4$–$C_{10}$ ring structure:

a. where the ring is aromatic this embodiment is exemplified by phthalic anhydride, trimellitic anhydride, dimellitic anhydride, and naphthalene tetracarboxylic dianhydride.

b. Where the ring is a saturated, aliphatic (carbon-to-carbon) ring, this embodiment is exemplified by hexahydrophthalic anhydride, cyclooctane-1,2-dicarboxylic anhydride, and cyclobutane dicarboxylic anhydride.

c. Where the ring is an unsaturated, aliphatic (carbon-to-carbon) ring, this embodiment is exemplified by tetrahydrophthalic anhydride.

d. Where the ring is heterocyclic, this embodiment is exemplified by tetrahydrofuran-2,3,4,5 - tetracarboxylic dianhydride, 7 oxabicyclo [2.2.1] hept-5-ene-2,3-dicarboxylic anhydride.

It will be understood by those skilled in the art that the afore-listed monomeric anhydrides may have a hydrogen atom replaced with a methyl, butyl, propyl, butyl, methoxy, ethoxy, propoxy or butoxy group or a halogen atom. In the case of the heterocyclic anhydrides, ring substitution for a carbon atom may be an oxygen atom, a sulfur atom, a divalent silicon radical or a divalent phosphorous radical. The anhydride is employed in a quantity sufficient to provide about 0.5 to about 1.5, preferably 0.6 to 0.9, anhydride groups for each epoxy group in the molding powder.

Suitable polymeric polyanhydrides include polymeric polyanhydrides of the formula:

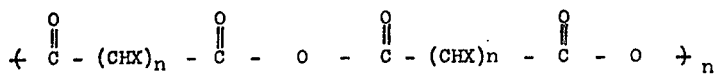

wherein $X = H$, $CH_3$, $C_2H_5$, or a halogen atom and $n$ is 4 to 10. These limits are exemplified by polyadipic polyanhydride ($n = 4$) and polysebacic polyanhydride ($n = 10$). A particularly useful polymeric polyanhydride is polyazelaic polyanhydride. The value of $n$ is such that molecular weight of the polyanhydride is in the range of 1,000 to 5,000.

The polymeric polyanhydride crosslinking agent is employed in sufficient quantity to provide about 0.5 to about 1.5, preferably 0.6 to 0.9, anhydride groups per each epoxy group in the molding powder.

The dibasic acids which are used as crosslinking agents in this invention are $C_4$–$C_{20}$, dibasic acids which have melting points in the range of 30° to 130° C. Among these, those dibasic acids have an odd number of carbon atoms are preferred. Typical dibasic acids which are suitable for this use includes adipic acid, azelaic acid, 2,4'-benzophenone-dicarboxylic acid, brassylic acid, 1,4-cyclohexane dicarboxylic acid, fumaric acid, glutaric acid, alpha ketoglutaric acid, itaconic acid, maleic acid, malonic acid, octadecyl malonic acid, pimelic acid, phthalic acid, isophthalic acid, terephthalic acid, sebacic acid, suberic acid, succinic acid, tetradecanedioic acid, and undecanedioic acid. The dibasic acid is employed in an amount which provides about 0.8 to about 1.2 carboxyl groups per each epoxy group in the molding powder. These acids consist essentially of carbon, hydrogen and oxygen, i.e., they either consist exclusively of these elements or, if substituted, are substituted with atoms or functional groups which do not interfere with the cross-linking reaction, e.g., sulfonyl groups, nitro groups, alkylthio groups and halogens.

The diphenols which are used as crosslinking agents in this invention have molecular weights in the range of about 110 to about 500. They consist essentially of carbon, hydrogen and oxygen and may have substituents which do not interfere with crosslinking reaction, e.g., sulfonyl groups, nitro groups, alkylthio groups and halogens. Suitable diphenols include, but not by way of limitation, Bisphenol A, 2,7 dihydroxy naphthalene, 4,4'-sulfonyl diphenol, 1,1'-Bis (4-hydroxyphenyl) cyclohexane, 0,0'-Bisphenol, Bis (4-hydroxyphenyl) methane, hydroquinone, etc. This crosslinking agent is employed in sufficient quantity to provide 0.90 to 1.0 hydroxyl groups for every epoxy group in the molding powder mixture.

The diphenol-epoxy resin adduct crosslinking agent used in this invention is a hydroxy-terminated crosslinking agent formed by reacting a diphenol with an epoxy resin containing at least two epoxy groups, preferably a diepoxide.

Suitable diphenols include those above listed for use as crosslinking agents per se. The ratio of diphenol to epoxy resin is selected to obtain adducts having molecular weights in the range of about 700 to about 4,000 and softening points in the range of 40° C. to 140° C. Generally 1.2 to 2.5 moles of diphenol per mole of diepoxy resin is used. The adducts have viscosity at 150° C. of less than 100 poises. The adduct formation can be facilitated by employing catalysts such as triethylenediamine, imidazole and quartenary ammonium salts such as those hereinafter mentioned with reference to the catalyst for the molding powder mix.

The epoxy resins have at least two epoxy groups and are preferably a diepoxide. These diepoxides should be liquid at 140° C. or below and have molecular weight in the range of about 200 to about 3,000. The diepoxide may be aromatic, an acyclic or a cycloaliphatic diepoxide. Such diepoxides should consist essentially of carbon, hydrogen and oxygen but may have substituents which do not interfere with the crosslinking reactions. These diepoxides are well known in the art and many are commercially available. Typical examples include diglycidyl esters of polybasic or dibasic acids as disclosed in U.S. Pat. No. 2,866,767; diglycidyl ethers of dihydric phenols as disclosed in U.S. Pat. Nos. 2,467,171; 2,506,486; 2,640,037 and 2,841,595; diglycidyl ethers of diols as disclosed in U.S. Pat. Nos. 2,538,072 and 2,581,464 and diepoxides obtained by peracid epoxidation of dienes. A collection of suitable diepoxides are illustrated in U.S. Pat. application Ser. No. 43,895, filed June 5, 1970 and these disclosures are incorporated herein by reference. Although the diepoxides are to be preferred for the present invention, low viscosity polyepoxides may also be advantageously used.

In this, the preferred embodiment, the adduct, is employed in a concentration which provides about 0.8 to about 1.1 moles of free (unreacted) phenolic hydroxyl per mole of free epoxy in the molding powder.

While the foregoing describes the embodiment wherein reaction (adduct formation) is complete or essentially complete, it is operable to blend the diephenol with the diepoxide under conditions such that adduct formation is achieved in part leaving in the blend a portion of the diphenol unreacted and/or a portion of the diepoxide unreacted. It is also operable to prepare merely a simple blend with no adduct formation in which case the diphenol serves much as it does in the instance where diepoxides are not employed.

In another instance, the crosslinking agent used is an aromatic amine having one or more, preferably two, primary amine groups. There may be monomeric or polymeric. A preferred amine is 4,4'-methylenedianiline. Other suitable amines include 4,4'-dithiodianiline; 4,4'-oxydianiline; 4,4'-sulfonyldianiline; 4,4'-(2,2'-butane) dianiline; 3,3'-sulfonyldianiline; 4-chloro-m-phenylenediamine; benzidine (4,4'-dianiline); 3,3'-diaminobenzidine; 1,5-diaminonaphthalene; 2,4-diaminotoluene; 2,5-diaminotoluene; 4,4'-methylene bis-(o-chloro-aniline); o-phenylenediamine; m-phenylenediamine, p-phenylene-diamine, etc.

The amine crosslinking agent is employed in sufficient quantity to provide 0.75 to 1.5, preferably about 1.0 and below 1.35, and most preferably between about 1.15 and about 1.30, active amine hydrogen atoms, i.e., hydrogen atoms directly attached to an amine nitrogen, for every epoxy group in the prepolymer. Other crosslinking agents, for example, a caprolactam-blocked di- or tri-isocyanate, can also be used. These crosslinking agents are di- or tri-isocyanates wherein the isocyanate groups are directly attached to an aromatic ring and are blocked by a blocking agent which deblocks to give free isocyanate at a temperature in the range of about 120° to 160° C. The blocking agent must be non-volatile at molding temperatures. Caprolactam (b. p. 232° C.) is a preferred blocking agent. A preferred crosslinking agent of this category is caprolactam-blocked triphenyl dimethylene triisocyanate.

V. Partial Replacement for Prepolymer With Epoxy Compound

A minor portion, i.e., about 2 to about 20 percent, of the epoxy groups provided by the prepolymer may be replaced by substituting for that amount of the prepolymer an epoxy compound having at least two epoxy groups, preferably a diepoxide.

These diepoxides should be liquid at 140° C. or below and have molecular weight in the range of about 300 to about 4,000 and viscosity at 140° C. of less than 50 poises.

The diepoxide may be an aromatic, an acyclic aliphatic or a cycloaliphatic diepoxide. Such diepoxides should consist essentially of carbon, hydrogen and oxygen but may have substituents which do not interfere with the crosslinking reactions, e.g., sulfonyl groups, nitro groups, alkylthio groups and halogens.

These diepoxides are well known in the art and many are commercially available. Typical examples include diglycidyl esters of polybasic or dibasic acids as disclosed in U.S. Pat. No. 2,866,767; diglycidyl esters of dihydric phenols as disclosed in U.S. Pat. Nos. 2,467,171; 2,506,486; 2,640,037; and 2,841,595; diglycidyl ethers of diols as disclosed in U.S. Pat. Nos. 2,538,072 and 2,581,464 and diepoxides obtained by peracid epoxidation of dienes. A collection of suitable diepoxides are illustrated in U.S. Pat. application Ser. No. 43,895, filed June 5, 1970 and these disclosures are incorporated herein by reference. Although the diepoxides are to be preferred for the present invention, low viscosity polyepoxides may also be advantageously used.

VI. Catalysts

A catalyst is employed in the molding powder mix to facilitate the crosslinking reaction. Quarternary ammonium salts exhibit a high degree of specificity for the epoxy-anhydride reaction. These include tetrabutyl ammonium iodide, chloride, bromide, tetraethyl ammonium iodide, chloride and bromide, tetramethyl ammonium bromide, chloride and iodide, benzyl trimethyl ammonium iodide, chloride and bromide, benzyl dimethyl phenyl ammonium chloride, bromide and iodide, stearyl dimethyl benzyl ammonium iodide, bromide and chloride, etc.

Other catalysts which may be used include solid tertiary amines such as triethylene diamine, amine salts such as trimethylamine-p-toluene sulfonate or imidazoles such as 2-ethyl-4-methyl imidazole or metal carboxylates such as lithium benzoate.

These catalysts are found to be latent catalysts for the crosslinking reaction that is to say that the catalysts do not significantly enhance the rate of reaction at room temperature but are effective only above certain temperatures. The catalysts that are latent up to at least 50° C. are preferred.

VII. Molding

After the epoxy-functional prepolymer, the organic crosslinking agent, catalyst, particulate inorganic reinforcing materials, and other organic additives, if any, are reduced to particulate form by grinding or other suitable means and then further reduced in size by ball milling, shearing, or equivalent means to average maximum diameter in the range of about 5 to about 10 microns, the molding powder mix is ready for molding. Prior to molding, however, it is common and desirable to intimately mix the molding powder with fibrous material, particularly chopped glass fibers which are conventionally about one-fourth inch in length. This intermixing is advantageously effected by tumbling or similar techniques to preserve the dimensional integrity of the fibers.

The powders thus prepared are suitable for use in injection molding, compression molding and transfer molding. Molding is carried out at a temperature in the range of about 300°–400°F., preferably 350°–380°, at a pressure in the range of about 500 to about 2,000 psi, preferably 1,000 to 1,600 psi.

This invention will be more fully understood from the following illustrative examples wherein flexural properties of the molded specimens are determined by Flexural Test, American Society of Testing & Materials, D 790–1966. In this test rectangular bars having thickness one-eighth inch, width 0.500 inch – 0.600 inch and length 4 inches are used for determining the flexural properties. A table model Instron, mechanical testing machine, is used herein for testing. It is set up at a crosshead speed of 0.04 in/min and a recorder chart speed of 2 inches per minute. The formulas in procedure B (ASTM-D 790-66) are used for the calculation of Flexural Modulus, Elongation-To-Break and Strength.

This invention will be more fully understood from the following illustrative examples.

EXAMPLE 1

The copolymer is made from a mixture of monomers having the following composition:

| Monomer | Amount(g) | Percentage |
| --- | --- | --- |
| glycidyl methacrylate | 532 | 31.0 |
| methyl methacrylate | 870 | 50.5 |
| methacrylonitrile | 318 | 18.5 |

Fifty four (54.0 grams) 2,2′-azobis-(2= methyl propionitrile), hereinafter termed AIBN, are added to the monomer mixture. The solution is added dropwise over a 4 hour period into 1,250 ml toluene maintained at 108°–111° C. under nitrogen atmosphere. Then 2.0 grams AIBN dissolved in 20 ml acetone are added dropwise over a 1 hour period and refluxing continued for 3 additional hours.

The polymer solution is diluted with 3,000 ml acetone and coagulated in 5 volumes hexane. The white powder is dried in vacuum oven at 70° C. for 35 hours. This copolymer has average molecular weight of $M_w/M_n = 6231/3466$ and WPE of 496.

This dry prepolymer is used in the preparation of molding powder. The copolymer in the amount of 30.0 grams is mixed with 6.9 grams of Bisphenol A and 0.064 grams tetrabutyl ammonoum iodide are combined and preground to about 10 mesh with a mortar and pestle. The molding powder ingredients are charged to a ½ gallon pebble mill containing 150 grams of porcelain spheres ¾ inch diameter. They are ball-milled for 16 hours. To the pebble mill charge are added 44.0 grams calcium metasilicate ($CaSiO_3$) and the mixture is ball-milled for 1 hour for homogeneous blending of the mixture. This powder has an average particle diameter of about 8 microns with less than 10 percent of the particles having maximum diameter about 25 microns.

This powder in the amount of 60.0 grams is tumbled with 20.0 grams chopped glass fibers (average length ¼ inch — all chopped glass fibers used in succeeding examples are of this length). The final powder-glass fiber mix is dropped through a 2 foot high tower for better distribution of the fibers. Then the mix is pressed into a preform.

A sheet (4.7 × 5.2 × ⅛ inches — all sheets molded in succeeding examples are of these dimensions) — is molded from this powder and fiber mix by compressing the mix at a pressure of 1,500 psi at a temperature of 380° F. for 30 minutes. The room temperature flexural properties of the molded sheet are as follows:

| Flexural Strength,psi | Elongation-To-Break,% | Flexural Modulus,psi |
| --- | --- | --- |
| 24,510 | 1.8 | $2.02 \times 10^6$ |

EXAMPLE 2

The procedure of Example 1 is repeated with the sole difference that the pulverization of the ingredients. The molding powder ingredients are preground to approximately 20 mesh with a mortar and pestle. Then they are fed into a jet mill. This mill utilizes fluid energy for pulverization. The reduction in particle size takes place by particle-to-particle collision where the particles are entrained in a gaseous medium made up of high velocity counter flows. Grinding by air is combined with good air classification. The particle diameter of powder accumulated in the collector is 5–15 microns. This powder is combined with 44.0 grams calcium metasilicate ($CaSiO_3$) and ball milled in a pebble mill until a homogeneous mixture is obtained and the average particle diameter is in the range of about 5 to about 10 microns. The molded products have flexural properties essentially the same as in Example 1.

EXAMPLE 3

The procedure of Example 1 is repeated with larger particles used in the molding step. The molding powder ingredients are preground to approximately 10 mesh with a mortar and pestle. These particles are charged into a ½ gallon pebble mill containing 120 grams porcelain spheres ¾ inch in diameter. After ball-milling the ingredients for 1 hour, 44.0 grams calcium metasilicate ($CaSiO_3$) are combined with ingredients and the final mix is ball-milled for an additional hour.

The average particle size diameter of molding powder is 100 microns. This powder mix is processed and molded using the identical procedures and molding conditions employed in Example 1. The molded sheets are found to have the following structural properties:

| Flexural Strength,psi | Elongation-To-Break,% | Flexural Modulus,psi |
|---|---|---|
| 19,250 | 1.60 | $1.65 \times 10^6$ |

When these properties are compared with the same properties of the sheets molded in Example 1, the marked superiority of the sheets prepared in Example 1 is quite obvious.

EXAMPLE 4

The procedure of Examples 1 - 3 are repeated with the sole difference being that the prepolymer is formed from the following monomers:

| | | |
|---|---|---|
| glycidyl methacrylate | 15 | wt. % |
| methacrylonitrile | 20 | " |
| methyl methacrylate | 65 | " |

EXAMPLE 5

The procedure of Example 1-3 are repeated with the sole difference being that the prepolymer is formed from the following monomers:

| | | |
|---|---|---|
| glycidyl methacrylate | 25 | wt. % |
| methacrylonitrile | 20 | " |
| methyl methacrylate | 55 | " |

EXAMPLE 6

The procedure of Examples 1-3 are repeated with the sole difference being that the prepolymer is formed from the following monomers:

| | | |
|---|---|---|
| glycidyl methacrylate | 35 | wt. % |
| methacrylonitrile | 20 | " |
| methyl methacrylate | 45 | " |

EXAMPLE 7

The procedure of Examples 1-3 are repeated with the difference being that the Bisphenol A crosslinking agent is replaced with a Bisphenol adduct. This adduct is prepared as follows: There is charged into a 500 ml. stainless steel beaker 38.0 grams of a commercially available diepoxide. This diepoxide is heated to 150° C. To the melted diepoxide is added 45.6 grams of Bisphenol A with stirring. The temperature of the mix is maintained at 150° C. for 1.5 hours while the mixture is stirred. The reacted mixture is poured out into an aluminum pan and cooled. The solid resin having a molecular weight of 836 is ground to pass through a 60 mesh screen prior to final particle reduction. The prepolymer and this adduct crosslinking agent are employed in amounts to provide a ratio of free (unreacted) epoxy groups to free phenolic hydroxy groups in the molding powder that is identical to the same ratio in Example 1. The diepoxide employed in this example has the following properties: liquid at room temperature, epoxide equivalent about 185 to about 192, and average molecular weight of about 380. This diepoxide is represented by the following structural formula wherein $n$ averages less than 1.

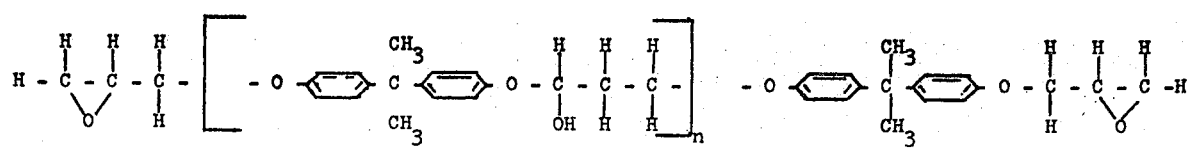

EXAMPLE 8

The procedures of Examples 1-3 are repeated with the difference that the Bisphenol A crosslinking agent is replaced by tetrahydrophthalic anhydride. Equimolar amounts of the copolymer (prepolymer) and the anhydride are employed.

EXAMPLE 9

The procedures of Examples 1-3 are repeated with the difference that the Bisphenol A crosslinking agent is replaced by polyazelaic polyanhydride. Equimolar amounts of the copolymer (prepolymer) and the polymeric anhydride are used.

EXAMPLE 10

The procedures of Examples 1-3 are repeated with the difference that the Bisphenol A crosslinking agent is replaced with adipic acid, a dibasic acid. Two moles of the copolymer (prepolymer) are employed per mole of adipic acid.

EXAMPLE 11

The procedures of Examples 1-3 are repeated with the difference that the Bisphenol A crosslinking agent is replaced with 4,4'-methylenedianiline, a diamine. A chemically equivalent amount of copolymer (prepolymer) and crosslinking agent are employed.

EXAMPLE 12

The procedures of Examples 1-3 are repeated with the difference that the Bisphenol A crosslinking agent is replaced with caprolactam-blocked triphenyl dimethylene triisocyanate. A chemically equivalent amount of copolymer (prepolymer) and crosslinking agent are employed.

EXAMPLE 13

The preceding examples, excepting Example 4, are repeated with the difference that 10 percent of the copolymer (prepolymer) is replaced with a commercially available solid diglycidyl ether having the following properties: melting point 64° – 75° C., epoxide equivalent 450–525 and average molecular weight of about 900. This diepoxide has the same structural formula as that of the diepoxide of Example 4 and here the average value of $n$ is about 2.

EXAMPLE 14

The procedures of Examples 1–3 are repeated with the difference that the average molecular weight ($M_n$) of the prepolymer is about 1,500.

EXAMPLE 15

The procedures of Examples 1–3 are repeated with the difference that the average molecular weight ($M_n$) of the prepolymer is about 2,000.

EXAMPLE 16

The procedures of Examples 1–3 are repeated with the difference that the average molecular weight ($M_n$) of the prepolymer is about 5,000.

EXAMPLE 17

The procedures of Examples 1–3 are repeated with the difference that the average molecular weight ($M_n$) of the prepolymer is about 10,000.

EXAMPLE 18

The procedures of Examples 1–3 are repeated with the difference that the average molecular weight ($M_n$) of the prepolymer is about 15,000.

The term "inorganic particulate material" as used herein excludes fibrous materials of which glass fibers is an example.

The foregoing examples are illustrative of the invention defined in the appended claims. Those skilled in the art will be aware that modifications may be made in such examples without departing from the scope of the invention as set forth in the general disclosure and the appended claims.

We claim:

1. In a method for producing reinforced, thermoset resin articles of manufacture wherein a particulate moldable material which, on a catalyst and fibrous material-free basis, consists essentially of an epoxy-functional copolymer of acrylic monomers, organic crosslinking agent for said copolymer and inorganic particulate solids and has an average maximum particle diameter above 10 microns is molded at elevated temperatures and pressures, the improvement wherein:
   1. said epoxy functional copolymer of acrylic monomers consists of about 15 to about 40 weight percent glycidyl methacrylate which provides said copolymer with its epoxy-functionality, about 10 to about 30 weight percent methacrylonitrile and a remainder consisting essentially of methyl methacrylate;
   2. said epoxy-functional copolymer of acrylic monomers has a softening point above 25°C and an average molecular weight in the range of about 1,500 to about 16,000 with less than 5 percent of the molecules of said copolymer having an average molecular weight below 1,000;
   3. said epoxy-functional copolymer of acrylic monomers, said organic crosslinking agent for said copolymer and said inorganic particulate solids have been mechanically reduced to an average maximum particle diameter below about 10 microns prior to molding with less than 10 percent of the particles thereof having a maximum diameter above 25 microns and intimately mixed to form a molding powder; and
   4. said molding powder is molded at a temperature in the range of 300°–400°F at a pressure in the range of about 500 to about 2,000 psi.

2. The method of claim 1 wherein said epoxy-functional copolymer of acrylic monomers has an average molecular weight in the range of 2,000 to 10,000.

3. The method of claim 1 wherein said epoxy-functional copolymer of acrylic monomers has an average molecular weight in the range of 3,500 to 8,000.

4. The method of claim 1 wherein said epoxy-functional copolymer of acrylic monomers has a softening point in the range of 50° to 110°C.

5. The method of claim 1 wherein said molding powder is molded at a temperature in the range of 350°–380°F and at a pressure in the range of 1,000 to 1,600 psi.

6. The method of claim 1 wherein said epoxy-functional copolymer of acrylic monomers consists essentially of about 20 to about 35 weight percent glycidyl methacrylate, about 10 to about 25 weight percent methacrylonitrile and a remainder consisting essentially of methyl methacrylate.

7. In a method for producing reinforced, thermoset resin articles of manufacture wherein a particulate moldable material which, on a catalyst and fibrous material-free basis, consists essentially of an epoxy-functional copolymer of acrylic monomers, organic crosslinking agent for said copolymer and inorganic particulate solids and has an average maximum particle diameter above 10 microns is molded at elevated temperatures and pressures, the improvement wherein:
   1. said epoxy-functional copolymer of acrylic monomers consists of about 20 to about 35 weight percent glycidyl methacrylate which provides said copolymer with its epoxy-functionality, about 10 to about 25 weight percent methacrylonitrile and a remainder consisting essentially of methyl methacrylate,
   2. said epoxy-functional copolymer of acrylic monomers has a softening point in the range of about 5° to about 110°C and an average molecular weight in the range of about 1,500 to about 16,000 with less than 5 percent of the molecules of said copolymer having an average molecular weight below 1,000,
   3. said epoxy-functional copolymer of acrylic monomers, said organic crosslinking agent for said copolymer and said inorganic particulate solids have been mechanically reduced to an average maximum particle diameter between about 5 and about 10 microns with less than 10 percent of the particles thereof having a maximum diameter above 25 microns and intimately mixed to form a molding powder, and
   4. said molding powder is molded at a temperature in the range of 300°–400°F at a pressure in the range of about 500 to about 2,000 psi.

8. The method of claim 7 wherein said epoxy-functional copolymer of acrylic monomers has an average molecular weight between 2,000 and 10,000.

9. The method of claim 7 wherein said epoxy-functional copolymer of acrylic monomers consists essentially of about 20 to about 35 weight percent glycidyl methacrylate, about 10 to about 25 weight percent methacrylonitrile and a remainder consisting essentially of methyl methacrylate.

10. The method of claim 7 wherein said molding powder is molded at a pressure in the range of 1,000 to 1,600 psi.

11. The method of claim 7 wherein said molding powder is molded at a temperature in the range of 350°–380°F.

* * * * *